US010543854B2

(12) United States Patent
Wiebel-Herboth et al.

(10) Patent No.: US 10,543,854 B2
(45) Date of Patent: Jan. 28, 2020

(54) GAZE-GUIDED COMMUNICATION FOR ASSISTANCE IN MOBILITY

(71) Applicant: HONDA RESEARCH INSTITUTE EUROPE GMBH, Offenbach/Main (DE)

(72) Inventors: Christiane Wiebel-Herboth, Offenbach (DE); Matti Krüger, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 16/165,234

(22) Filed: Oct. 19, 2018

(65) Prior Publication Data

US 2019/0118834 A1    Apr. 25, 2019

(30) Foreign Application Priority Data

Oct. 20, 2017  (EP) .................................... 17197513

(51) Int. Cl.
*B60Q 1/00* (2006.01)
*B60W 50/16* (2012.01)
(Continued)

(52) U.S. Cl.
CPC ............ *B60W 50/16* (2013.01); *B60K 35/00* (2013.01); *B60W 30/0953* (2013.01);
(Continued)

(58) Field of Classification Search
None
See application file for complete search history.

(56) References Cited

U.S. PATENT DOCUMENTS

2015/0009010 A1*  1/2015  Biemer ................... G06F 21/32
                                                 340/5.83
2016/0318520 A1* 11/2016  Bigdelou .............. B60W 50/08
(Continued)

FOREIGN PATENT DOCUMENTS

EP          2 133 851 A1    12/2009
JP        2006-163828 A      6/2006
(Continued)

OTHER PUBLICATIONS

European Search Report dated May 9, 2018 corresponding to European Patent Application No. 17197513.9.

*Primary Examiner* — Adolf Dsouza
(74) *Attorney, Agent, or Firm* — Squire Patton Boggs (US) LLP

(57) ABSTRACT

The invention assists a person in acting in a dynamic environment. A method and a system for assisting a person operating an ego-vehicle a person supporting the operation of the ego-vehicle in a dynamic environment such as a traffic environment is proposed. The method encompasses determining a gaze direction of the person and identifying a target object based thereon, generating prediction information predicting a future behavior of the target object and the ego-vehicle, estimating a time-to-event or a distance or a distance variation for the ego-vehicle and the target object and generating a signal for driving an actuator and indicative of the estimated time-to-event, distance or distance variation. The actuator causes a stimulation being perceivable by the person by its perceptual capabilities based on the generated signal. The method determines whether assistance for assessing the dynamic situation is requested, for example by monitoring a gaze behavior of the person.

16 Claims, 5 Drawing Sheets

(51) Int. Cl.
*B60W 50/10* (2012.01)
*G06F 3/01* (2006.01)
*B60W 30/095* (2012.01)
*B60K 35/00* (2006.01)
*B60W 50/14* (2012.01)

(52) U.S. Cl.
CPC ........ *B60W 30/0956* (2013.01); *B60W 50/10* (2013.01); *G06F 3/013* (2013.01); *B60K 2370/146* (2019.05); *B60K 2370/148* (2019.05); *B60W 2050/146* (2013.01)

(56) References Cited

U.S. PATENT DOCUMENTS

| | | | |
|---|---|---|---|
| 2017/0309173 A1* | 10/2017 | Heckmann | G08G 1/0112 |
| 2018/0075309 A1* | 3/2018 | Sathyanarayana | G05D 1/0088 |
| 2018/0276485 A1* | 9/2018 | Heck | G07C 5/0866 |
| 2018/0365772 A1* | 12/2018 | Thompson | G06N 7/005 |

FOREIGN PATENT DOCUMENTS

| | | |
|---|---|---|
| JP | 2007-286898 A | 11/2007 |
| JP | 2008-021265 A | 1/2008 |
| WO | WO 2016/209423 A1 | 12/2016 |

* cited by examiner

FIG. 3  EXAMPLE SCENARIO 1

31 FREQUENT LOOKS IN THE SIDE MIRROR DUE TO INTENDED LANE CHANGE

32 SYSTEM DETECTS A BEHAVIOR PATTERN THAT INDICATES POTENTIAL BENEFIT FROM ASSISTANCE FUNCTION AND OFFERS ASSISTANCE

33 USER CONFIRMS WISH FOR ASSISTANCE, FOR EXAMPLE BY SQEEZING STEERING WHEEL

34 USE OF DEICTIC GAZE TO INDICATE OBJECT OR REGION OF INTEREST

35 SYSTEM RECOGNIZES DEICTIC GAZE AND INFERS OBJECT OF INTEREST IN ATTENDED REGION

36 SYSTEM COMPUTES TTC ESTIMATE TO INFERRED ENTITY

37 SYSTEM CONVEYS TTC ESTIMATE VIA DYNAMIC FEEDBACK, FOR EXAMPLE THROUGH VIBRATIONS IN THE STEERING WHEEL

38 USER MAY CARRY OUT A MORE INFORMED OPERATION, FOR EXAMPLE A LANE CHANGE

GAZE-GUIDED COMMUNICATION FOR ASSISTANCE IN MOBILITY

BACKGROUND

Field

The invention is in the field of assisting a person in operating a vehicle in a dynamic environment. In particular, a method and a system for assisting a person in operating a vehicle using a drive assistance system is proposed.

Description of the Related Art

Acting in a dynamic environment, for example in the automotive domain, becomes more demanding the more entities such as other traffic participants or similar objects are involved in such dynamic environment. A typical example for such a complex and highly dynamic environment is a traffic environment in urban areas. A person driving a vehicle has to address an increasing amount of issues and needs to cope with a high load of information in order to navigate the vehicle. In particular, the user has to acquire many pieces of information, to process, for example to filter those acquired pieces of information in order to arrive at the best decision how to act for driving the vehicle. In order to cope with this situation, different drive assistance systems were developed that assist the user, in particular a driver in performing his driving task. An important aspect of such drive assistance systems is that information that is acquired by a sensor system that is capable of perceiving the environment of an ego-vehicle mounting the sensor system does not need to be perceived directly by the person acting as vehicle driver. Thus, the person can concentrate on other aspects of a scene. Filtering information with respect to its importance can be performed in many cases by such assistance systems.

A traffic situation is only one example where it is desirable to assist a person in perceiving all relevant aspects in his environment and in filtering information. It is evident that such assistance systems are also suitable for a person navigating a boat or a ship or any other person that has to act in a dynamic environment.

A drive assistance system analyses a scene by using sensors for acquiring sensor information on the environment, processes the acquired sensor information and assists a person acting as a vehicle user by presenting warnings, making suggestions on how to behave in the current traffic situation or even by performing driving functions at least partially autonomously. Presenting information to an operator by the drive assistance system has the disadvantage that it requires the user to actively shift his or her attention in order to achieve successful information transmission. Thus, the user's concentration on other aspects of a traffic scene is impaired which may in turn result in a reduction of safety.

In order to overcome this problem and to provide information to the person that extends the person's field of attention without necessarily requiring active shifts in the person's attention using resources otherwise not employed for the driving task is desirable. Thus, information would be available that the person would otherwise not use for deciding on how to react. Such human sensory enhancement for dynamic situations is particularly advantageous in highly dynamic environments where objects and in particular vehicles acting in the dynamic environment move relative to one another.

In the past attempts have been made to communicate for example a distance and/or a direction of an entity with respect to a person to this person. As a consequence the person who may not even have recognized the other entity, for example because this entity was occluded or way out of the line of sight, can nevertheless react, because he is informed about the existence, direction and proximity of the entity. This already improves environment perception for a person, in particular when available senses of a human are used, that currently are not used otherwise actively by a person in the situation, for example tactile perception. One such known system is a blind spot surveillance system that observes an area in the environment of a vehicle, which is usually not observed actively by a vehicle user who focusses on the area in front of the vehicle. In case that another vehicle is close to the ego-vehicle in an unobserved area, a warning will be output to the user. For example, vibrations of the steering wheel can be used to stimulate the user when the user is actually the vehicle driver. This is a typical example of how a sensory capability of a driver, which is not actively used to perceive the environment, can be used to provide additional information. The user can then in turn use the provided additional information for improved assessment of the entire traffic situation. For example, the user can be alerted of the presence of another vehicle, which is driving in the blind spot of the vehicle driver. Thus, the user can have a short look to get additional knowledge of the situation, a knowledge of which he was previously unaware.

SUMMARY

The object of the present invention is to assist a person (user) operating a vehicle in judging a situation in a dynamic environment by providing the person with easy to recognize information about potential events relating to task-relevant entities or a relation between the ego-vehicle and another object (target object).

The problem is solved by the method for assisting a person in assessing a dynamic environment while operating an ego-vehicle according to independent claim 1 and the system according to the corresponding independent claim.

The dependent claims include further advantageous embodiments of the present invention.

The method for assisting a person operating an ego-vehicle in assessing a dynamic environment comprises a step of determining a gaze direction of the person and identifying a target object based on the gaze direction. The target object (target entity) is identified as the object in the environment of the ego-vehicle which is momentarily focused by the assisted person. In a step of generating prediction information a future behavior of the target object and the ego-vehicle is predicted. Such behavior includes for example a predicted trajectory of the target object. Then a time-to-event or a distance or a distance variation for the ego-vehicle and the target object is estimated and subsequently a signal for driving an actuator and indicative of the estimated time-to-event or distance or distance variation is generated. The signal is output to the actuator and the actuator causes a stimulation being perceivable by the person by its perceptual capabilities.

The inventive method provides an assistance system that can contribute to the person's situation assessment, in particular by providing information on a time-to-event or on a distance between the target object and the ego-vehicle or on a distance variation (for example closing a gap between the ego-vehicle and its predecessors as target object) between the target object and the ego-vehicle. The time-to-event can be a time-to-contact (TTC) or a similar measure of relative distance or velocity with an entity in a region of the environment. The event can for example be a fictive collision between the target object and the ego-vehicle or the target object reaching a specific position. The region of the environment may be defined by the region at which the person directs his gaze, for example when the person activates the function of assisting in assessing the dynamic environment. The gaze direction dependent information provided by the method supports the person and user in carrying out actions that are appropriate for the encountered situation. As a consequence, the person is enabled to successfully perform the task of driving the ego-vehicle with improved safety and comfort.

The method has a capability to encode a time-to-event, for example a time-to-contact or a similar measure of relative distance and relative velocity corresponding to a distance variation between the entities in the direct environment of an ego-vehicle in real time by means of a feedback signal directly perceivable by the person. The person is then capable to take account of such additional information while controlling the ego-vehicle in a complex and rapidly changing traffic environment. This is achieved without directly interfering with the general task, in particular vehicle control performed by the person acting as driver. The person remains integrated in the loop of control for operating the vehicle and therefore no restrictions with respect to a fully autonomous control of a vehicle apply. Moreover, the inventive method provides an interaction between the person and a drive assistance system in an intuitive manner by exploiting a two-fold potential of human gaze behavior. On the one hand, gaze behavior, in particular a focus of gaze of the person, indicates general attention of the person and in particular a direction of the focus of attention of the person. Accordingly, the drive assistance system may even determine gaze detection of the person and then interpret the determined gaze direction for predicting an intention of the person. On the other hand, deictic gaze is a non-verbal communication tool, for establishing communication between the person and the system. Accordingly, the present method establishes gaze detection as a further communication line to establish joint attention of a person associated with an entity, for example the user of the ego-vehicle, and the method or a system implementing the method installed in the ego-vehicle. The gaze detection also enables confirmatory feedback between the person and the system implementing the method in a humanly intuitive manner and not interfering with other means of interacting between the user and the ego-vehicle. Moreover, the person can use deictic gaze specifically to indicate to the system implementing the method for which entity in the environment the person desires to learn time-to-event. It is to be noted that "time-to-event" is used throughout this document as a placeholder for any value describing a relation of the target object with respect to any other entity or position in the environment of the ego-vehicle. The capabilities of a drive assistance system may be used more thoroughly. Furthermore, processing resources on board of the ego-vehicle may simultaneously be employed more economically as the focus of the person steering the vehicle becomes apparent. Acceptance of assisted driving systems may even be increased by the user-initiating provision of supplementary information at low additional burden for instructing the drive assistance system, while the user is still offered a role in the control loop for operating the ego-vehicle.

The term deictic denotes showing or pointing out directly, more particular a deictic gaze is to be understood as a gaze, which directed directly at an entity (or mirror image of such entity) or a combination of entities in the environment. The term gaze generally denotes a coordinated motion of the eyes, head and neck of a person, in current case in particular a direction of visual attention of the person defined by the direction into which the eyes and in particular the pupils of the person are directed.

The method is particularly advantageous when navigating in dense traffic or under difficult environmental conditions, for example under conditions of reduced visibility such as at night, in twilight, in rain, fog or snowfall. Accordingly, the risk of accidents in particular under such environmental conditions is reduced.

Complex traffic situations with rapidly varying distances and velocities, for example due to lane changes, become easier to handle. This is achieved by easy access to information such as time-to-event information, to relative distance and a distance variation corresponding to a relative velocity information by employing the inventive method. The method implements a cooperative assistance system that supports the person in his individual situation assessment for increased user comfort. Safety and efficiency of making maneuvering decisions in the dynamic environment are further improved. The method realizes a cooperative man-machine interaction approach with the additional advantage that the person as user remains in the decision-making loop and remains in charge of the situation. Contrary thereto, known semi-autonomous systems suffer from the inherent consequences of automation. If for example an entire task is performed by a machine, the probability increases that a person starts to rely entirely onto the technical system for performing the task and the person is then generally less attentive to the surrounding environment or elements of the environment which are supposedly monitored by the drive assistance system. Consequently, accident risks may even increase due to a misuse of the system, deterioration of user attention and a decreasing capability to handle difficult situations.

Alternatively or additionally, the generated signal can encode the time-to-event or distance or distance variation, wherein the generated signal is adapted to drive the actuator with an increasing saliency for a decreasing time-to-event, distance or distance variation.

Encoding the time-to-event, distance or distance variation into the signal enables the actuator to communicate the additional information in an intuitively understandable manner to the person.

According to another embodiment, the method includes modifying the generated signal, in particular the encoded estimated time-to-event, distance or distance variation, in order to adapt to a perceived context for which the time-to-event, distance or distance variation is estimated. In particular, the generated signal is adapted based on predicted trajectories of the ego-vehicle and of the target object and/or a perceived environmental condition.

This provides the capability to further adapt the information in the signal to a specific situation, such as a situation of a low visibility in a traffic environment and further improves the context sensitivity of the information, for example a rapidly decreasing distance to a preceding vehicle when encountering fog.

Further, alternatively or additionally, the generated signal is updated and the updated signal is output repeatedly over a time period, in particular taking into account new estimated values for the time-to-event, the distance or the distance variation.

The situation awareness for the potentially rapidly changing dynamic environment is improved as the communicated information is adapted over time.

According to another advantageous embodiment, the method is characterized in repeatedly outputting the updated generated signal and terminating the repeatedly outputting of the signal based on at least one of a user input and exceeding or falling below a threshold, in particular by the time-to-event exceeding a critical time margin or the distance exceeding a critical distance value.

This ensures that only relevant information and information actually desired by the person is communicated. Information overload of the person operating the ego-vehicle is thus avoided.

Alternatively or additionally, the method comprises receiving from the person a user input requesting assistance in assessing the dynamic environment. The user input can be received by at least one of sensing a pressure to an interface component, receiving an acoustic command, sensing a gesture of the person, measuring a gaze pattern, detecting patterns of muscle activation, and determining a pattern of neuronal activation of the person.

The interaction with the user to start the assistance function enables tailoring the presence of the assistance function only to those times, at which the user actually desires or wants additional information tailored to his specific needs. The acceptance of the system will be increased, as the user actively had requested the drive assistance system's assistance when the drive assistance system function is activated.

According to another preferred embodiment, the method determines whether activating assistance for assessing the dynamic environment is requested, in particular by monitoring a gaze behavior of the person.

Monitoring the gaze behavior of the person is an effective method to decide if the person might be in need of assistance.

Alternatively or additionally, the method assists the person in assessing the dynamic environment by estimating the time-to-event, the distance or the distance variation and generates the signal for driving the actuator and indicative of the time-to-event, the distance or the distance variation with respect to a region of the dynamic environment, which is behaviorally attended by the person.

It is particularly advantageous to monitor the gaze behavior of the person by analyzing a gaze pattern of the user.

Pattern recognition offers an efficient method for classifying and therefore identifying the intentions of a person by its gaze behavior, for example using image signals acquired via cameras imaging the head and in particular the eyes of the person.

Alternatively or additionally, the actuator is configured to cause a tactile stimulation of the person based on the generated signal encoding the time-to-event, distance or distance variation. The time-to-event, distance or distance variation is encoded in at least one of a stimulus frequency, an amplitude, a waveform such as in particular an amplitude modulation, an interpulse interval and a pulse duration of the tactile stimulation.

According to another advantageous embodiment, the actuator is configured to emit an audible sound signal based on the generated signal encoding the time-to-event, distance or distance variation. The time-to-event, distance or distance variation is encoded in at least one of a pitch, a volume, a duration, a timbre and a speech content of the sound signal.

Alternatively or additionally, the actuator is configured to emit a visual signal based on the generated signal encoding the time-to-event, distance or distance variation. The time-to-event, distance or distance variation is encoded in at least one of a color, a brightness, a contrast, and a visually perceivable pattern of the visual signal.

Alternatively or additionally, the actuator is configured to emit a heat signal based on the generated signal encoding the time-to-event, distance or distance variation. The time-to-event, distance or distance variation is encoded in a temperature level, a change of temperature level, a perceived temperature level or a perceived change of a temperature level. In particular, the time-to-event can be encoded such that a perceived temperature is high for a short time-to-event and a perceived low temperature represents a high time-to-event, distance or distance variation. The temperature range used for encoding the time-to-event, distance or distance variation can be selected absolute or relative to a temperature value. The temperature range may vary in accordance with contextual features of the environment, for example an ambient temperature of the environment and/or a body temperature of the person. The perceived temperature may be varied (modulated) without changing an average actual temperature. A risk of burning of freezing due to the changed temperature is thus avoided.

Alternatively or additionally, the actuator is configured to emit an electromagnetic signal based on the generated signal encoding the time-to-event, distance or distance variation. The electromagnetic signal is adapted to electromagnetically stimulate the activity of a nervous system of the person. The time-to-event, distance or distance variation is encoded in at least one of an electric and/or magnetic field parameter, a stimulus location on the body of the person and/or a stimulus duration of the electromagnetic signal.

Stimulation can occur by magnetic induction such as a transcranial magnetic stimulation or through the application of electric currents to the person's nerve cells, for example by indirect stimulation using conductive media in direct contact with the person.

Alternatively or additionally, the actuator is configured to emit a chemical signal based on the generated signal encoding the time-to-event, distance or distance variation. The time-to-event is encoded in at least one of a stimulus location, a stimulus amount, a stimulus duration, a stimulus frequency, a pattern of stimulation and a chemical composition of the chemical signal.

The chemical signal is selected to produce a reaction that results in a variation of the activity of the person's nerve system.

Additionally or alternately a stimulation may be generated by the actuator emitting light pulses to light-sensitive biological tissue. This may be feasible for use in combination with tissue containing optogenetic actuators such as microbiological rhodopsins.

According to an advantageous embodiment, the signal encoding the time-to-event, distance or distance variation is generated further according to at least one of a selected user preference and a context adequacy. This ensures that the system is adaptable to different users and different personalities of users, even an actual mood of the user. Acceptance of the system can accordingly be further increased.

The system for assisting a person in assessing a dynamic environment according to a further aspect of the invention comprises a gaze direction determining unit configured to determine a gaze direction of the person and determining a target object based thereon. Furthermore, a processor is configured to generate prediction information predicting a future behavior of the target object and of the ego-vehicle. The processor is also configured to estimate a time-to-event or a distance or a distance variation for the ego-vehicle and the target object. The system also includes a signal generator configured to generate a signal for driving an actuator and indicative of the estimated time-to-event or distance or distance variation. The actuator causes a stimulation being perceivable by the person by its perceptual capabilities.

The third aspect of the invention solves the above-mentioned problem by a computer program (computer program-product) with program-code means for executing the steps according to any of the before mentioned embodiments, when the program is executed on a computer or a digital signal processor. The program can be stored on a machine-readable data carrier.

The third aspect of the invention solves the problem by a digital storage medium with electronically readable control signals, which can interact with a computer or digital signal processor when the program is executed on a computer or a digital signal processor.

BRIEF DESCRIPTION OF THE DRAWINGS

The structure of the system, the different method steps and the various advantages of using such a method and system will become apparent from the discussion of the embodiments, in which FIG. 3 depicts a scenario in which the assistance system is initiated according to an embodiment.

DETAILED DESCRIPTION

Figure 1:
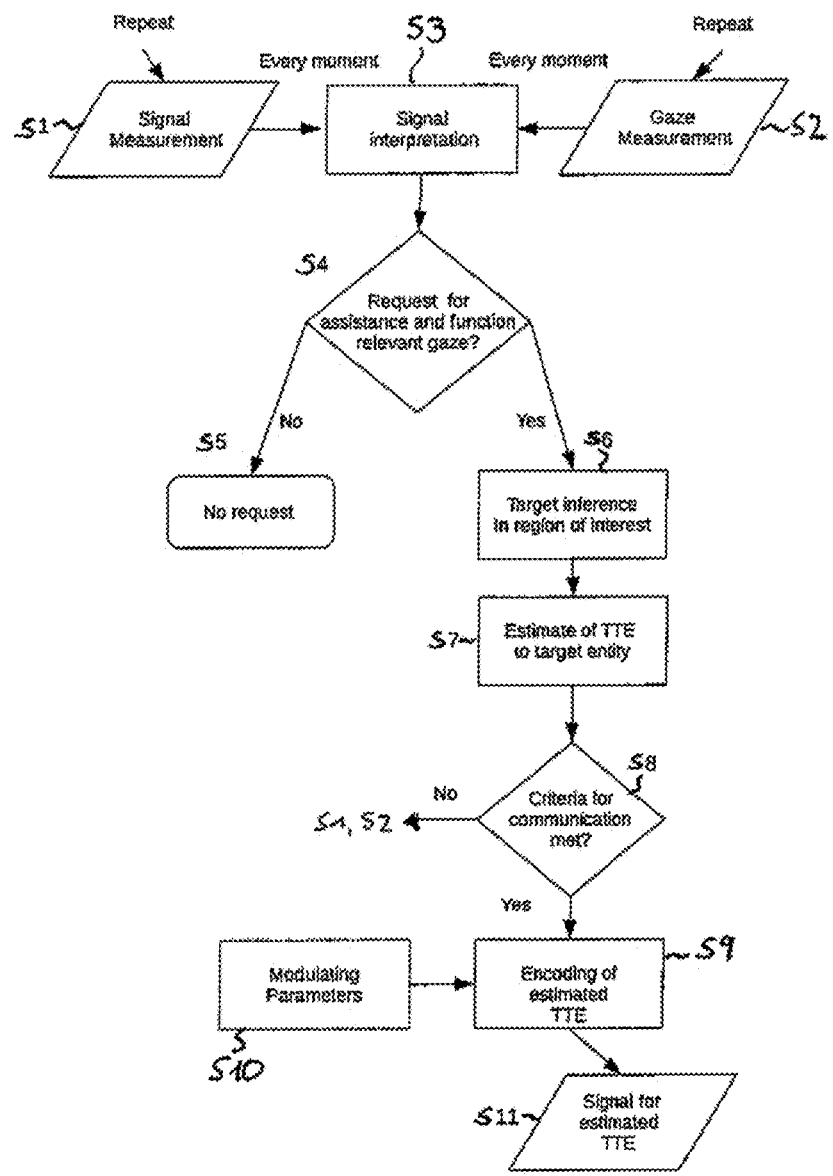
FIG. 1 shows a flowchart for the process of signal encoding according to an embodiment.

Generally, the invention is in the field of mobility systems and in assistance in operating mobility systems. A mobility system can be a vehicle, in particular a car or a motor cycle. The mobility system can also be a watercraft (vessel), an air vehicle or a space vehicle. The vehicle may be controlled by a user (person) on board of the vehicle or may be remotely controlled from a remote control position (facility). The vehicle may be partially or fully autonomously operating. Respectively, the user (operator) of the vehicle and the assistance method can be a driver (vehicle driver), a rider in case of a motorcycle or a pilot of the vehicle. The user can also be a co-driver, co-pilot or navigator, which typically performs one or more subtasks of operating the vehicle and assists a pilot or driver. The user also may be a teacher in operating the vehicle, typically including duplicate vehicle controls on the vehicle. Furthermore, in case of a remotely controlled vehicle, the user may be an operator of a remotely piloted vehicle who performs vehicle control from a position detached from the vehicle.

Operating a vehicle is to be understood in present application as driving (piloting) vehicle or performing at least one of the tasks such as steering, accelerating or decelerating (braking), navigating or supervising the operation of the vehicle.

The invention uses the term time-to-event (TTE). The time-to-event is a measure, which describes the time that elapses until an event occurs. The event can be a collision between objects, for example two entities moving in the environment, or reaching a particular position or a threshold distance to another object. In this case, the time-to-event corresponds to a time to collision or time-to-contact (TTC). The determination of a TTC may be performed as known from other advanced driver assistance systems (ADAS) based on predicted trajectories for the entities involved in a traffic situation. In cases where the available information is not sufficient to obtain a TTE with a required certainty, an estimate for the TTE may be determined. The term TTE estimate denotes measures, estimated inferences and predictions of the TTE regardless of the implicated uncertainty of the TTE. The term TTE estimate is also used to describe alterations to TTE estimates due to various parameters and variables considered relevant in assessing the dynamic environment. Examples for alterations to TTE estimates can be adaptations to predicted trajectories of entities due to specific persons, specific vehicles, and environmental factors as examples for relevant contextual factors. An example for an alteration of a TTE estimate can be a strategic choice to communicate more conservative, for example slightly shorter time values for the TTE estimate than the TTE estimate values actually provided by the drive assistance system.

The term behavioral attention in the present context refers to any behavior or event produced by an entity that is considered to indicate an attentional process. A behaviorally attended region is understood as describing the region of the environment of a person to be associated with an entity, towards which a detected gaze is directed. A gaze direction may be detected by determining the direction to which the pupils of the person's eyes are oriented (focus). For example, the eye's planes of focus and the eye's fovea can be determined. The eye's ocular behavior of the person may be classified and further taken into account to determine behavioral attention and/or the behaviorally attended region. The eye's ocular behavior can be determined further by determining fixations and saccades in the person's eye movements. Also other behaviors such as the orientation of the person's head may be used additionally or alternatively behavioral indicators. Generally, any behavior produced by an entity, which may be classified as revealing information for inferring a region of attention of the entity can be summarized under the term behavioral attention.

FIG. 1 shows a flowchart for the process of signal encoding according to an embodiment.

In step S1, at least one sensor 1, 2, 3, 4 continuously and/or intermittently (repeatedly) obtains signals from an environment of the system 1. The environment of the system corresponds to an environment of an entity, for example an ego-vehicle mounting the sensor 1, 2, 3, 4 and processing equipment including a processor 5, a memory 6 and a user interface hardware. Furthermore, in step S2 at least one of the sensors 1, 2, 3, 4 acquires a sensor signal, which enables to determine a gaze direction of person.

The at least one of the sensors 1, 2, 3, 4 can be a camera or a camera array which monitors the person seated in a driving seat of the vehicle. The at least one of the sensors 1, 2, 3, 4 acquires a sensor signal which enables to determine a gaze direction of the person. Any commonly known eye-tracking system may be used. The camera may in particular cover the upper body (torso), the neck and the head of the person. The camera's or the camera array's field of vision may mainly include those frontal views of the head of the user, when the user looks into those directions a driver of a vehicle usually uses when performing his driving task. The person is in particular a driver of the ego-vehicle and simultaneously a user of the system. The signals obtained from the environment and the signals including information on gaze behavior of the person are both provided to the processor 5 for interpretation during processing. Camera and processor form the gaze direction determining unit.

The signals from the environment are processed in step S3 in the known manner to describe the environment and the entities forming part of the environment. Examples of entities are static and moving objects, for example target objects such as other traffic participants or infrastructure, but also road infrastructure elements such as traffic lights.

The processor 5 furthermore interprets in step S3 the signals including information on gaze behavior of the person. This may include in particular interpretation of the signals including information on gaze behavior. Interpreting the signal information on gaze behavior of the person can include preprocessing to take account of driving mirrors and respectively changed and reflected axis of vision due to mirrors arranged in an interior or attached to the exterior sides of the ego-vehicle.

The processed signals including information on gaze behavior are then analyzed and interpreted in step S4, if a request for initiating an assistance function is derived from the processed signals. If no request for initiating the assistance function is determined in step S5, the method returns to steps S1 and S2.

If in step S4 a request for an assistance function is determined, the assistance function is initiated in step S6. During initiation of the assistance function, a region of interest in the environment is identified. This may be performed by correlating a detected gaze direction with a region of the environment and/or one or more entities arranged and perceived by the system in the region of interest or in a region associated with the region of interest (behaviorally attended region).

The region associated with a behaviorally attended region can include the attended region being representative of a region in the environment of the ego-vehicle. This includes, for example a case in which the attended region includes a mirror or a screen displaying information, for example image information on a region not directly observable by the operator. For example, the ego-vehicle may be truck, which lacks a functional center mirror. Information on an area immediately behind the truck may however be presented on a screen arranged such that it can be read by the operator.

Thus, generally predefined areas in the environment of the ego-vehicle may be mapped to behavioral gestures to different directions seen from the operator than the actual direction of the predefined areas as seen from the operator is.

In a succeeding step S7, a time-to-event, for example a time-to-event with respect to a target entity identified in the region of interest is calculated by the processor. This time-to-collision may for example be determined from data generated by the drive assistance system of the ego-vehicle in step S2 and interpreted in step S3.

In step S8 succeeding to step S7, the estimated time-to-event for the target entity can be used to determine if a criterion for communication is met. This may be implemented by comparing the estimated time-to-event for the target object with a time threshold. If step S8 determines the criterion for communication not to be met, the method returns to steps S1 and S2. If on the other hand, the criterion for communication is met, for example the time-to-event is below a predetermined threshold or if it has been explicitly requested by the operator, the method proceeds to step S9.

In step S9, the estimated time-to-event is encoded into a signal (actuation signal). For encoding the time-to-event into the actuation signal, additional parameters can be acquired in step S10. The additional parameters (modulating parameters) may for example be context dependent parameters, which are taken into account when encoding the time-to-event to generate the actuation signal.

Context dependent parameters can describe the environment and its specific state, for example the visibility due to fog, rain snow, glare due to humidity, road states such as ice, road surface, etc.

In step S11, the actuation signal is provided to the actuator 8.1, 8.2 for causing a stimulation, which is perceivable by the person by its perceptual capabilities. In particular, the actuation signal indicative of the time-to-invent for the predicted event may be emitted by a haptic signal to the person.

Figure 2:
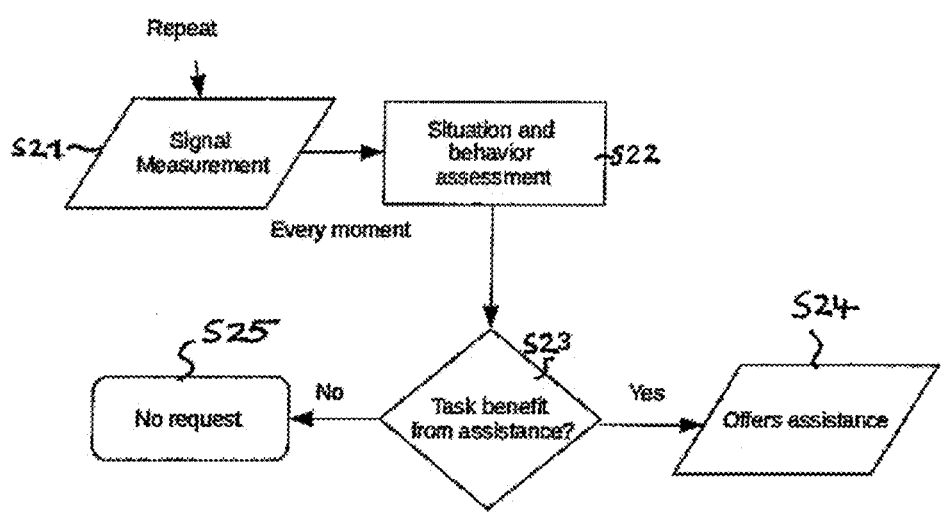
FIG. 2 shows a further flowchart for the process of assistance system initiation according to an embodiment.

FIG. 2 shows a further flowchart for the processing of the assistance system initiation according to an embodiment. In particular, the embodiment of FIG. 2 shows a system initiation processing in case that the assistance system is not actively requested by the user. In that case, the assistance system can be adapted to estimate the person's benefit from getting assistance, for example based on changes in behavioral pattern of the person.

In step S21, the sensor 1, 2, 3, 4 continuously obtains measurements from the person, for example, the camera captures images from the user. In step S22, the processor 5 performs processing on the obtained images. The processing in particular determines variations in behavior of the user, for example of gaze direction, of a frequency of occurrences of gazes into a specific direction or performs processing for obtaining similar measurements.

In step S23 for each measurement, the processor 5 then estimates a likelihood, describing that an additional information on the environment would be beneficial and welcome to the user. In particular, it can be estimated if the user would benefit from information indicative of a time-to-event for a specific event which is defined as being possible to occur in the sensed environment. If the estimated likelihood exceeds a predetermined threshold, the system decides that the user would benefit from activation of the assistance function. Consequently, the assistance function is activated in step S24. Alternatively, activation of the assistance function is at least offered to the user in step S24.

If the estimated likelihood from step S23 is below a predetermined threshold, the system decides that the user would not benefit from activation of the assistance function. Consequently, the assistance function is not activated in step S25. Alternatively, activation of the assistance function may at least be offered to the user in step S25 and performed only after receiving user confirmation.

FIG. 3 depicts a first exemplary scenario in which the assistance system is initiated and active according to an embodiment.

The depicted scenario shows in particular that the system initiates the interaction between the system and the user based on an estimate whether the user may benefit from the assistance function. The depicted scenario is in the area of assisted driving of a vehicle in a traffic environment. It is evident, that a respective scenario can be applied for use cases such as steering ships or activities such as mountaineering, skiing without deviating from the method.

The system, for example a camera sensor 1, 2, 3, 4 of the system (see FIG. 5) monitors a steering position taken by a person as a driver of the vehicle and detects in step S31 that the driver frequently looks in a left side mirror of the vehicle. Taking the existence of a further driving lane to the left of the lane of the ego-vehicle into account, the system predicts an intended behavior of a lane change to the left lane. In step S32, the system determines a behavior pattern of the user that indicates a potential benefit for the user of the vehicle from the assistance function. The system offers its assistance to the user. This offer for assistance may be performed by using a haptic signal via actuators 8.1, 8.2. The actuators may be integrated into the steering wheel of the vehicle. In step S3, the user confirms his wish to accept the offered assistance. The acceptance may be received by the system for example by the user squeezing the steering wheel. The interaction between the system and the user in steps S31 to S33 essentially initiates the assistance function. In step S34, the user further provides an indication of an object of interest or a region of particular interest in the environment of the vehicle. In the exemplary first scenario, the user focuses his gaze to a left side mirror of the vehicle and to an entity visible in the left side mirror. This entity (target object) can be an approaching car on the left lane, which is the target object identified by the user using deictic gaze.

Using camera sensors 1, 2, 3, 4 of the system in FIG. 3 the processor recognizes the deictic gaze, determines the direction of gaze, identifies the entity of interest in the visible region in the left side mirror in succeeding step S35. This processing provides the effect of reducing the complex traffic scenario to a partial scenario of particular interest to the user. The system calculates a time-to-event, for example a time-to-contact for the present situation involving the ego-vehicle and the target object approaching from backwards on the left lane. This may be calculated in step S36 in an advanced drive assistance system of the ego-vehicle. The calculation of a time-to-contact is generally known and may provide an estimated elapsed time until predicted trajectories of the ego-vehicle and the target vehicle (target object) are intersecting.

The system now encodes the estimated time-to-contact into a signal provided to the actuator 8.1, 8.2. In the present case the actuator 8.1, 8.2 may be a vibrotactile actuator integrated into the steering wheel of the ego-vehicle. In step S37, the actuator 8.1, 8.2 conveys the time-to-contact estimate as dynamic feedback to the user of the ego-vehicle. In the first exemplary scenario the dynamic feedback may be communicated by vibrations in the steering wheel to the user. The vibrations may be generated by the actuator 8.1, 8.2 in the form of pulsed vibrations over a time as long as the time-to-contact value is below a predetermined threshold. In step S38, the user now performs a lane change to the left lane taking into account the information conveyed to him by the vibrotactile signal emitted by the actuator 8.1, 8.2 indicative of the time-to-contact estimated by the system. The operation of a lane change is now executed taking into regard additional information offered from the system and provided in an intuitive manner.

Figure 4:
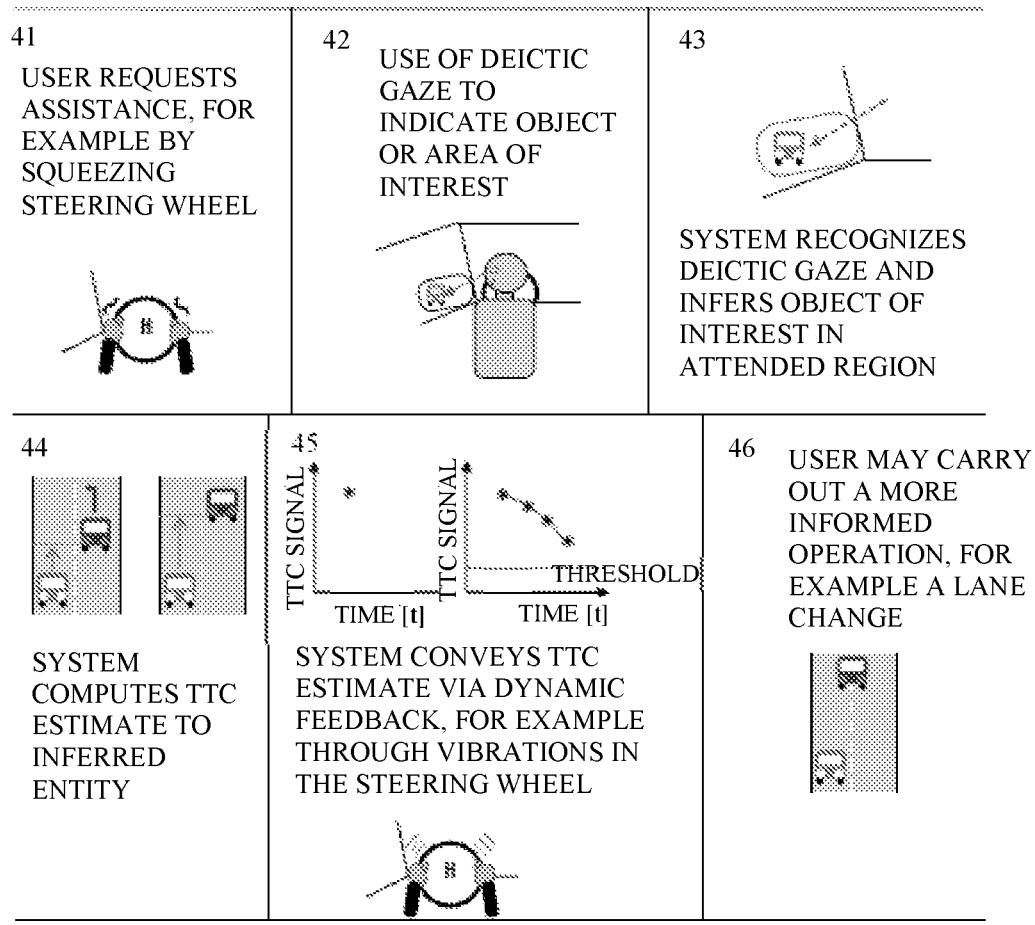
FIG. 4 depicts a further scenario in which the assistance system is initiated according to an embodiment, and FIG. 5 a block diagram depicting main structural elements according to an embodiment.

FIG. 4 depicts a second exemplary scenario in which the process of the assistance system is initiated according to an embodiment. The basic traffic scenario corresponds to the scenario as discussed with respect to the first exemplary scenario depicted in FIG. 3.

Contrary to FIG. 3, the depicted second exemplary scenario shows in particular that the user now actively requests the interaction between the system and the user. The depicted scenario is also in the area of assisted driving of a vehicle in a dynamically changing traffic environment.

In step S41, the user expresses his request to benefit from activating the assistance function of the system. This may be done by squeezing the steering wheel. Haptic sensors integrated in the steering wheel recognize the request signal and convey the information that assistance is requested to the system. The acceptance may be received by the system for example by the user squeezing the steering wheel. The interaction between the system and the user in step S41 essentially initiates the assistance function. In step S42, the user further provides an indication of an object of interest or a region of particular interest in the environment of the vehicle. In the exemplary second scenario the user focuses his gaze again onto the left side mirror and onto an entity visible in the left side mirror. This entity (target object) can be an approaching car on the left lane, which is targeted by the user using deictic gaze.

Steps 41 and 42 discussed sequentially above may be performed simultaneously in a preferred embodiment. In particular, a direction which is behaviorally attended by the operator at the time of activating the assistance function by pressing the steering wheel determines the region of interest.

Additionally or alternatively a time window can be defined around the time of the user request may be defined. A most prominent determined deictic gaze of the operator may be used to determine the region of interest. The time window can include a starting time prior to the time of the operator request.

The sensor 1, 2, 3, 4 of the system in FIG. 4 recognizes the deictic gaze. The processor 5 determines a gaze direction and identifies the entity of interest in the visible region in the left side mirror in succeeding step S43. The system now obtains a time-to-event, for example a time-to-contact for the present situation. This may be calculated in step S44 by the advanced drive assistance system of the vehicle. The calculation of the time-to-contact provides an estimated elapsed time until predicted trajectories of the ego-vehicle and the target vehicle (target object) intersect.

The system encodes in step S44 the estimated time-to-contact into a signal provided to the actuator 8.1, 8.2. In the present case the actuator also includes the vibrotactile actuator integrated into the steering wheel of the ego-vehicle. In step S45, the actuator 8.1, 8.2 conveys the time-to-contact estimate as dynamic feedback to the user of the ego-vehicle. In the exemplary scenario, the dynamic feedback may also be communicated by vibrations in the steering wheel to the user.

The vibrations may be generated by the actuator in the form of pulsed vibrations over a time as long as the time-to-contact value is below a predetermined threshold. In step S46, the user now performs a lane change to the left lane taking into account the information conveyed to him by the vibrotactile signal emitted by the actuator 8.1, 8.2 indicative of the time-to-contact estimated by the system. The operation of a lane change is executed taking into regard additional information requested from and provided by in intuitive manner from the system via actuators 8.1, 8.2.

Figure 5:
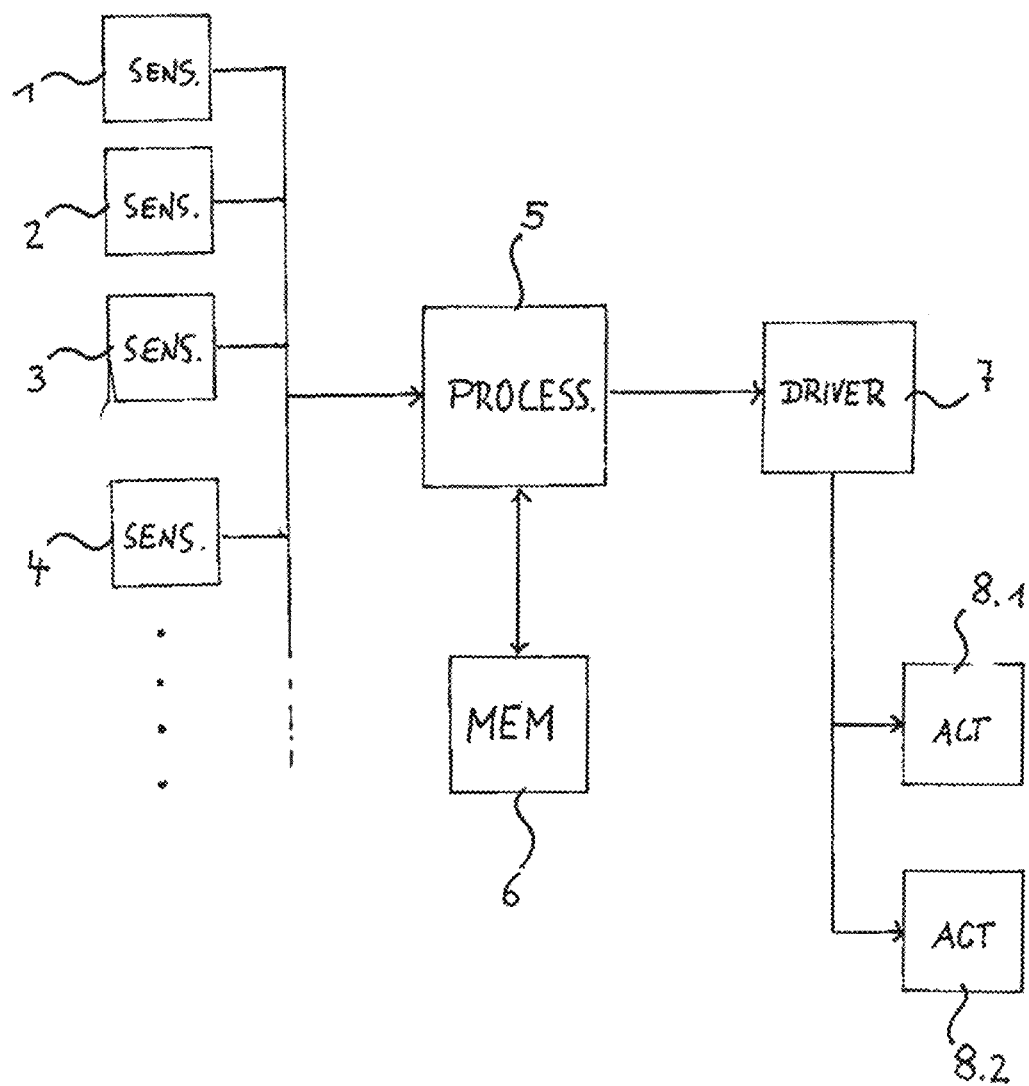

FIG. 5 provides a block diagram depicting main structural elements according to an embodiment of the inventive system.

Sensor 1 to sensor 4 physically sense entities in a dynamic scenario repeatedly in which entities may move relative to one another. In this example, time-to-contact estimation may be achieved by incorporating information from a variety of sensors 1, 2, 3, 4 acting as sensor signal sources.

Sensor 1 to sensor 4 may include data from radar, cameras and/or laser scanners arranged in or attached to a vehicle. Sensor 1 to sensor 4 provide sensor data which is filtered for features that identify relevant entities such as road infrastructure elements, vehicles, traffic participants and used to infer locations and distances.

By integrating distances and locations of entities over multiple samples, current relative velocities may be determined.

In combination with information about the velocity and acceleration and geometry of the ego-vehicle, as well as topographic information such as about road curvature and road inclination obtained from available map data or based on online measurements, predictions about future collisions of the ego-vehicle with other entities such as one or more target vehicles may be computed.

This sensing forms the basis for determining a relative position and velocity, relative to the person who is assisted by the system and the ego vehicle for relative the vehicle which is operated by the person assisted by the drive assistance system. From the sensed values information on states of the entities (direction, velocity) is derived at periodic intervals. This information is stored in a memory 6 and is the basis for example for behavior prediction and trajectory estimation. For each iteration of measurement, individual trajectories and relative velocities of the involved entities are estimated in a processor 5. The estimates provide the basis for inferences or predictions about possible future contact between the entity or entities of interest and other relevant entities in the environment. Also additional information that may be available and relevant for a scenario may be incorporated when making such estimates. The time-to-collision estimation is performed also by processor 5. The algorithms for predicting a future behavior, for example estimating a future trajectory of each of the entities including the ego-vehicle and the target object are known in the art and thus details thereof can be omitted. For the prediction procedure, probability distributions over different time-to-collisions could be generated for each direction in which potentially relevant entities are identified. Such distributions would be advantageous in that they preserve the uncertainties associated with the available information and may be suitable for the application of signal selection criteria.

The sensors 1, 2, 3, 4 also include one or more sensors which monitor the person acting as the user of the vehicle. In particular, the sensors provide a coverage of an upper portion of a body including the head and in particular the eyes of the person. The processor 5 uses the monitoring signals from the sensors 1, 2, 3, 4 to determine a gaze direction of the person based on these monitoring signals, for example taking into account head orientation and spatial arrangement of pupils of the eyes. The basic algorithms for determining a gaze direction are known, for example from the field of energy saving functions in mobile telephones. Further known algorithms origin from gaze based focus control in digital cameras. According to the invention, such algorithms can be used to determine a gaze direction of the person. By compensating a determined gaze direction for the effects of mirrors arranged in a visual field defined by the determined gaze direction and further correlating a visual field of interest with entities of the environment, a region of interest in the environment may be determined. Furthermore, entities of interest in the region of environment around the person may also be determined based on the determined gaze direction.

Decisions about which contact estimations should be used as the basis for directional time-to-collision encoding signals to be generated are made by processor 5. Such decisions may be based on availability of predictions in a given direction defining a region of interest, context-dependent criteria such as proximity of an event, and relevance of the respective entity and the certainty of prediction. Directional time-to-collision estimates are encoded in a signal based on which a person is stimulated via an interface (e.g. tactile interface) or not, depending on a decision of activating the assistance function. The signals are generated by a driver unit 7 that is adapted to drive the at least one actuator or actuator array 8.1, 8.2.

The system can comprise a plurality of actuators 8.1, 8.2 for applying the respective stimulation to a person according to the respectively used type of signal. Thus, the actuators 8.1, 8.2 may particularly be one or a plurality of the following types: vibrotactile actuator, loudspeaker, light emitter, electrode and heating element. It is particularly preferred when the plurality of actuators 8.1, 8.2 are arranged in an array configuration and even more that the stimulation of the person is performed around the person's body. This can be achieved by placing the actuators 8.1, 8.2 in a vest or jacket or attaching the actuators 8.1, 8.2 to a plurality of different members that for example when the person is an operator of the vehicle are necessarily put around the body or the hips of the person. One such combination of different members is using a seatbelt in combination with the seat of the vehicle.

The invention provides the person with information how long it may take in a current situation in the environment, until an event such as a collision involving an entity of interest, for example the ego-vehicle, and other relevant entities (identified target object), for example one or more target vehicles, in its environment occurs.

The use of this information may have positive effects on situation assessment in dynamic scenarios in which entities may move relative to one another. This makes it particularly valuable in mobile scenarios such as riding a bike or motorcycle, driving a car, navigating a boat, ship or aircraft but also for skiing and snowboarding.

Areas for advantageously applying the invention can in particular include traffic environments.

The invention may be highly advantageous in driving scenarios involving a lane change of the ego-vehicle. A traffic scenario including a lane change may comprise lane changes in case multiple lanes for one direction of traffic, the ego-vehicle overtaking one or more other vehicles in case of a road including one lane per direction, heading onto a highway or departing the highway by means of an entrance or exit lane. Each of the listed exemplary traffic situations requires adjusting a speed of the ego-vehicle such that it smoothly fits into a fitting gap between other vehicles on another neighboring lane. In order to execute this driving maneuver smoothly and without endangering the ego-vehicle as well as other traffic participants, an ego lane on which the ego-vehicle is travelling as well as the other lanes are to be monitored, in particular with respect to other vehicles. Distances and distance variations involving speeds of the other vehicles are to be monitored. The method and system are particular advantageous for the person driving the ego-vehicle in assessing the traffic situation, by encoding the estimate for the time-to-contact to other vehicles in the traffic situation and/or environment which are relevant to the encountered traffic situation. Using the gaze behavior of the person, who drives the ego-vehicle in order to activate the system ensures that the person employs the system for assisting in asserting the dynamic environment constituting the traffic situation in an intuitive manner in order to cope with the encountered traffic situation. Moreover, the person is invariably in the decision loop for the required decisions for coping with the actual traffic situation.

Other traffic situations, which present dynamic environments for advantageously employing the invention, include making a turn at an intersection without traffic lights that unambiguously regulate the traffic flow over the intersection. In particular, driving maneuvers such as turning left or right and merging into ongoing traffic by determining a fitting gap and smoothly merging into the determined fitting gap or turning left while encountering traffic from the opposite direction on the opposite lane, which is to be crossed, are supported. Similar to the traffic situation including a lane change, the turn situation requires that the person in the ego-vehicle continuously monitors the other moving traffic participants, for example estimates their respective vehicle speeds. According to the estimated speed, the person then adjusts his behavior suitably to select an appropriate fitting gap between other entities and adjusts the speed of the ego-vehicle accordingly. The method is particularly advantageous for the person driving the ego-vehicle in assessing the traffic situation, by encoding the estimate for the time to contact or relative vehicle speeds to the other vehicles in the traffic situation. Using the gaze behavior of the person, which drives the ego-vehicle to trigger activation of the system, or to vary the system functionality ensures that the system focusses on relevant regions of dynamic environment constituting the traffic situation in an intuitive manner in order to cope with the encountered traffic situation.

Driving the ego-vehicle under difficult environmental conditions such as rain, snow, fog, twilight and/or night involves dynamically changing environments. In particular assessing a speed of the ego-vehicle, or the relative or absolute speed of other target object in the environment may be particularly difficult or even impossible. The assistance method can be advantageously employed in assessing the traffic situation by encoding the time-to-contact to other entities which are denoted by the user as relevant or at least present in the environment.

The method and system may also be advantageously employed in supporting a race driver in planning and executing tactical driving maneuvers based on an optimized situation assessment. For instance supporting when judging whether overtaking an opponent before entering a curve is feasible may present another driving situation for benefiting from the invention.

The invention claimed is:

1. A method for assisting a person operating an ego-vehicle in assessing a dynamic environment, the method comprising:
    determining a gaze direction of the person and identifying a target object based thereon;
    generating prediction information predicting a future behavior of the target object and the ego-vehicle;
    estimating a time-to-event, or a distance between the ego-vehicle and the target object or a distance variation;
    generating a signal for driving an actuator and indicative of the estimated time-to-event or distance or distance variation, wherein the actuator causes a stimulation being perceivable by the person by its perceptual capabilities;
    determining whether activating assistance for assessing the dynamic environment is requested by the person; and
    generating the signal adapted to drive an actuator only when the person requests assistance for assessing the dynamic environment.

2. The method according to claim 1, wherein
the generated signal encodes the time-to-event or distance,
wherein the generated signal is adapted to drive the actuator with an increasing saliency for a decreasing time-to-event or distance.

3. The method according to claim 1, wherein
the generated signal, in particular the encoded estimated time-to-event or distance or distance variation, is modified based on a perceived context for which the time-to-event or distance or distance variation is estimated, in particular based on a predicted trajectory of one of the ego-vehicle and the target object or a perceived environmental condition.

4. The method according to claim 1, wherein
the generated signal is updated and the updated signal is output repeatedly over a time period, in particular taking into account new estimated values for the time-to-event or distance or distance variation.

5. The method according to claim 4, wherein
repeatedly outputting the updated generated signal is terminated by at least one of a user input by the person or by exceeding a threshold, in particular by the time-to-event exceeding a critical time margin or by the distance exceeding a critical distance value.

6. The method according to claim 1, further comprising:
receiving a user input from the person requesting assistance in assessing the dynamic environment,
the user input received by at least one of sensing a pressure to an interface component, receiving an acoustic command, sensing a gesture of the person, measuring a gaze pattern, detecting patterns of muscle activation and determining a pattern of neuronal activation of the person.

7. The method according to claim 1, further comprising:
determining whether activating assistance for assessing the dynamic environment is requested by monitoring a gaze behavior of the person.

8. The method according to claim 7, further comprising:
assisting the person in assessing the dynamic environment by estimating the time-to-event or distance or distance variation and generating the signal for driving the actuator and indicative of the time-to-event or distance or distance variation with respect to a region of the dynamic environment which is behaviorally attended by the person.

9. The method according to claim 7, further comprising:
monitoring the gaze behavior of the person by analyzing a gaze pattern of the user.

10. The method according to claim 1, wherein
the actuator is configured to cause a tactile stimulation of the person based on the generated signal encoding the time-to-event or distance or distance variation,
wherein the time-to-event or distance or distance variation is encoded in at least one of a stimulus frequency, an amplitude, a waveform such as in particular an amplitude modulation, an inter-pulse interval and a pulse duration of the tactile stimulation.

11. The method according to claim 1, wherein
the actuator is configured to emit an audible sound signal based on the generated signal encoding the time-to-event or distance or distance variation,
wherein the time-to-event or distance or distance variation is encoded in at least one of a pitch, a volume, a duration, a timbre and a speech content of the sound signal.

12. The method according to claim 1, wherein
the actuator is configured to emit a visual signal based on the generated signal encoding the time-to-event or distance or distance variation,
wherein the time-to-event or distance or distance variation is encoded in at least one of a color, a brightness, a contrast, and a visually perceivable pattern of the visual signal.

13. The method according to claim 1, wherein
the actuator is configured to emit a heat signal based on the generated signal encoding the time-to-event or distance or distance variation,
wherein the time-to-event or distance or distance variation is encoded in at least one of a temperature level, a change of temperature level, a perceived temperature and a perceived change of temperature level.

14. The method according to claim 1, wherein
the actuator is configured to emit an electromagnetic signal based on the generated signal encoding the time-to-event or distance or distance variation,
wherein the electromagnetic signal is configured to electromagnetically stimulate the activity of a nervous system of the person; and
the time-to-event or distance or distance variation is encoded in at least one of an electric and/or magnetic field parameter, a stimulus location and a stimulus duration of the electromagnetic signal.

15. The method according to claim 1, wherein
the actuator is configured to emit a chemical signal based on the generated signal encoding the time-to-event or distance or distance variation,
wherein the time-to-event is encoded in at least one of a stimulus location, a stimulus amount, a stimulus duration, a stimulus frequency, a pattern of stimulation and a chemical composition of the chemical signal.

16. A system for assisting a person operating an ego-vehicle in assessing a dynamic environment, the system comprising:
a gaze direction determining unit configured to determine a gaze direction of the person and determining a target object based thereon;
a processor configured to generate prediction information predicting a future behavior of the target object and the ego-vehicle and configured to estimate a time-to-event or a distance or a distance variation for the ego-vehicle and the target object; and
a signal generator configured to generate a signal for driving an actuator and indicative of the estimated time-to-event or distance or distance variation, wherein the actuator causes a stimulation being perceivable by the person by its perceptual capabilities,
wherein the processor is configured to determine whether activating assistance for assessing the dynamic environment is requested by the person, and
wherein the signal generator is configured to generate a signal adapted to drive an actuator only when the person requests assistance for assessing the dynamic environment.

* * * * *